(12) United States Patent
Uchibori

(10) Patent No.: US 6,584,105 B1
(45) Date of Patent: Jun. 24, 2003

(54) SCHEDULING APPARATUS, SCHEDULING METHOD AND COMMUNICATION CONTROL APPARATUS

(75) Inventor: Shusaku Uchibori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/275,075

(22) Filed: Mar. 24, 1999

(30) Foreign Application Priority Data

Mar. 24, 1998 (JP) ............................................ 10-076029

(51) Int. Cl.[7] .......................... H04L 12/26; H04L 1/00; H04J 3/14; G08C 15/00; G06F 11/00
(52) U.S. Cl. ...................... 370/395; 370/236; 370/399; 370/418; 709/240
(58) Field of Search ................................ 370/233, 236, 370/229, 395, 397, 399, 412, 468, 452, 477, 253, 465; 709/240, 249

(56) References Cited

U.S. PATENT DOCUMENTS

| | | | | |
|---|---|---|---|---|
| 5,712,851 A | * | 1/1998 | Nguyen et al. | 370/399 |
| 5,734,650 A | * | 3/1998 | Hayter et al. | 370/391 |
| 5,751,709 A | * | 5/1998 | Rathnavelu | 370/395 |
| 5,914,934 A | * | 6/1999 | Rathnavelu | 370/229 |
| 5,920,568 A | * | 7/1999 | Kurita et al. | 370/412 |
| 6,005,868 A | * | 12/1999 | Ito | 370/413 |
| 6,091,708 A | * | 7/2000 | Matsunuma | 370/233 |
| 6,137,779 A | * | 10/2000 | Miller et al. | 370/236 |
| 6,198,724 B1 | * | 3/2001 | Lam et al. | 370/233 |

FOREIGN PATENT DOCUMENTS

| | | |
|---|---|---|
| EP | 0 782 303 | 7/1997 |
| JP | H5-252185 | 9/1993 |
| JP | H8-79265 | 3/1996 |
| JP | H9-224034 | 8/1997 |

* cited by examiner

*Primary Examiner*—Huy D. Vu
*Assistant Examiner*—M. Phan
(74) *Attorney, Agent, or Firm*—Sughrue Mion, PLLC

(57) ABSTRACT

A scheduling apparatus of the present invention includes a first element which stores a pair comprising (1) an identifier for identifying a communication event and (2) time information. The time information shows the time for executing the communication event and is represented by floating point data having an accuracy necessary for the communication event. The scheduling apparatus has a second element which reads out the identifier from the first element by using current time information which is represented by the floating point data. A communication control apparatus of the present invention includes a first element which outputs time information and an identifier which identifies the communication event corresponding to the time information. The time information shows time of executing a communication event and is represented as floating point data having an accuracy necessary for communicating the communication event. The communication control apparatus has a second element which receives the time information and the identifier from the first element and stores a pair comprising (1) the time information and (2) the identifier and a third element which reads out the identifier from the second element by using current time information which is represented by floating point data.

8 Claims, 6 Drawing Sheets

FIG. 4

| Current time represented by binary integer data (301) | Current time represented by floating point data (121) |
|---|---|
| 00000001 | 000000 |
| 00000010 | 000001 |
| 00000011 | 000100 |
| 00000100 | 000010 |
| 00000101 | 001000 |
| 00000110 | 000101 |
| 00000111 | 001100 |
| 00001000 | 000011 |
| 00001001 | 010000 |
| 00001010 | 001001 |
| 00001011 | 010100 |
| 00001100 | 000110 |
| 00001101 | 011000 |
| 00001110 | 001101 |
| 00001111 | 011100 |
| 00010000 | Not applicable |
| 00010001 | 100000 |
| 00010010 | 010001 |
| 00010011 | 100100 |
| 00010100 | 001010 |
| 00010101 | 101000 |
| 00010110 | 010101 |
| 00010111 | 101100 |
| 00011000 | 000111 |
| 00011001 | 110000 |
| 00011010 | 011001 |
| 00011011 | 110100 |
| 00011100 | 001110 |
| 00011101 | 111000 |
| 00011110 | 011101 |
| 00011111 | 111100 |
| ⋮ | ⋮ |

SCHEDULING APPARATUS, SCHEDULING METHOD AND COMMUNICATION CONTROL APPARATUS

BACKGROUND OF THE INVENTION

The present invention relates to a scheduling apparatus, a scheduling method and a communication control apparatus, and more particularly, to a scheduling apparatus, a scheduling method and a communication control apparatus used for cell transmission scheduling or cell transmission shaping of a network apparatus such as asynchronous transfer mode (ATM) or the like.

A conventional scheduling apparatus, a scheduling method and a communication control apparatus of this kind has a shaper for holding the execution time of events corresponding to the events. To obtain an event to be executed at the current time, all shapers are investigated and an event with an execution time coinciding with the current time is selected. In an apparatus such as ATM, or the like, it is necessary that a single physical line be handled as a large amount of virtual lines of 60,000, or the like, that different cell rates are set to the respective lines and that the cell rate covers a wide range of 1 through $2^{32}$ cells per second, or the like. However, in the conventional apparatus and method, all of the shapers must be investigated in order to obtain an event executed at the current time. Therefore, a problem is created because the processing time period increases when the cell rate and capacity of the shaper increase.

An example of a scheduling apparatus addressing this problem is disclosed in EP0782303. According to the scheduling apparatus described in the publication, a time slot is provided for holding an identifier of an event corresponding to the event execution time. The apparatus schedules cell by reading out the time slot at a constant time interval. More specifically, in the apparatus and method described in the publication, the time information obtained is a multiple of a predetermined minimum time interval, is represented by binary integer data, and is used for writing to and reading from a time slot. However, a problem occurs because the capacity of a memory constituting the time slot becomes large when a wide range of communication rates are required in the apparatus, such as ATM.

Also, anther problem is created because it is inefficient to schedule the event based on time information obtained from a multiple of a predetermined minimum time interval for an event in which a highly accurate execution time is not required.

SUMMARY OF THE INVENTION

An object of the present invention is to provide a scheduling apparatus, a scheduling method and a communication control apparatus which can efficiently handle a wide range of communication rates.

Another object of the present invention is to provide a scheduling apparatus, a scheduling method and a communication control apparatus in which a scheduling table requires less memory than the conventional apparatus or method.

According to one aspect of the present invention, a scheduling apparatus is provided which includes: a first element which stores a data pair comprised of (1) an identifier for identifying a communication event and (2) time information which shows time for executing the communication event and is represented by floating point data having an accuracy necessary for the communication event; and a second element which reads out the identifier from the first element by using, current time information which is represented by the floating point data.

According to another aspect of the present invention, a scheduling apparatus is provided which includes: a first element which stores a data pair comprised of (1) a first event to be executed at a first execution frequency and (2) first time information which has a first accuracy based on the first execution frequency and shows the time when the first event is executed; and stores a data pair comprised of (1) a second event to be executed at a second execution frequency and (2) second time information which has a second accuracy based on the second execution frequency and shows the time when the second event is executed; and a second element which converts current time to either of the first or second time information; and a third element which reads out the first event or the second event stored in the first element by using the first time information or the second time information converted from the current time by the second element.

According to another aspect of the present invention, a scheduling method, which is performed by an apparatus connected to a storing element, is provided which includes: storing a data pair comprised of (1) an identifier that identifies a communication event and (2) time information which shows the time for executing the communication event and is represented by floating point data having an accuracy necessary for communicating the communication event to said storing element; and reading out the identifier from the storing element by using current time information which is represented by the floating point data.

According to another aspect of the present invention, a communication control apparatus is provided which includes: a first element which outputs time information which shows the time of executing a communication event and is represented as floating point data having an accuracy necessary for communicating the communication event and outputs an identifier which identifies the communication event corresponding to the time information; a second element which receives the time information and the identifier from the first element and stores a data pair comprised of (1) the time information and (2) the identifier; and a third element which reads out the identifier from the second element by using current time information which is represented by the floating point data.

BRIEF DESCRIPTION OF THE DRAWINGS

Other features and advantages of the invention will be, made more apparent by the following detailed description and the accompanying drawings, wherein:

FIG. 4 is a diagram showing an example of current time 121 of the present invention;

In the drawings, the same reference numerals represent the same structural elements.

DETAILED DESCRIPTION OF THE PREFERRED EMBODIMENTS

A first embodiment of the present invention will be described in detail below.

Figure 1:
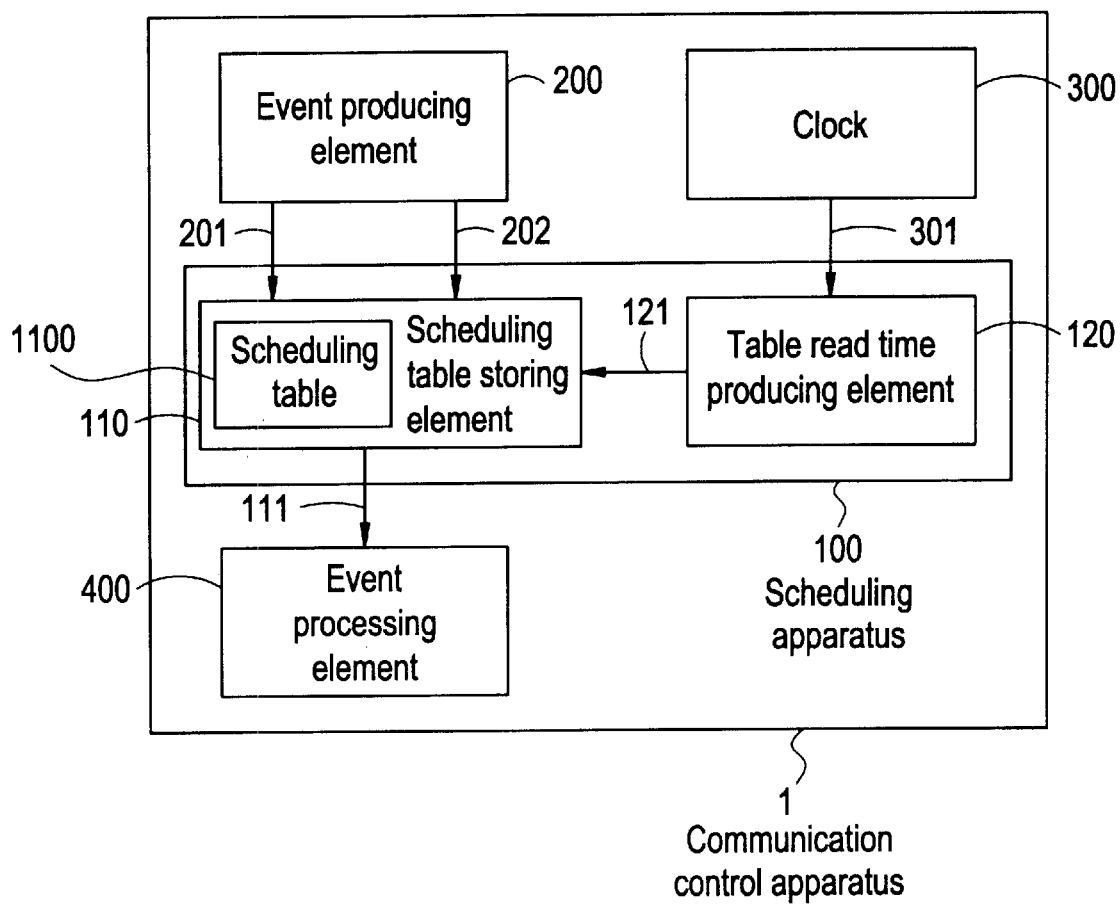
FIG. 1 is a block diagram of the present invention.
Figure 2:
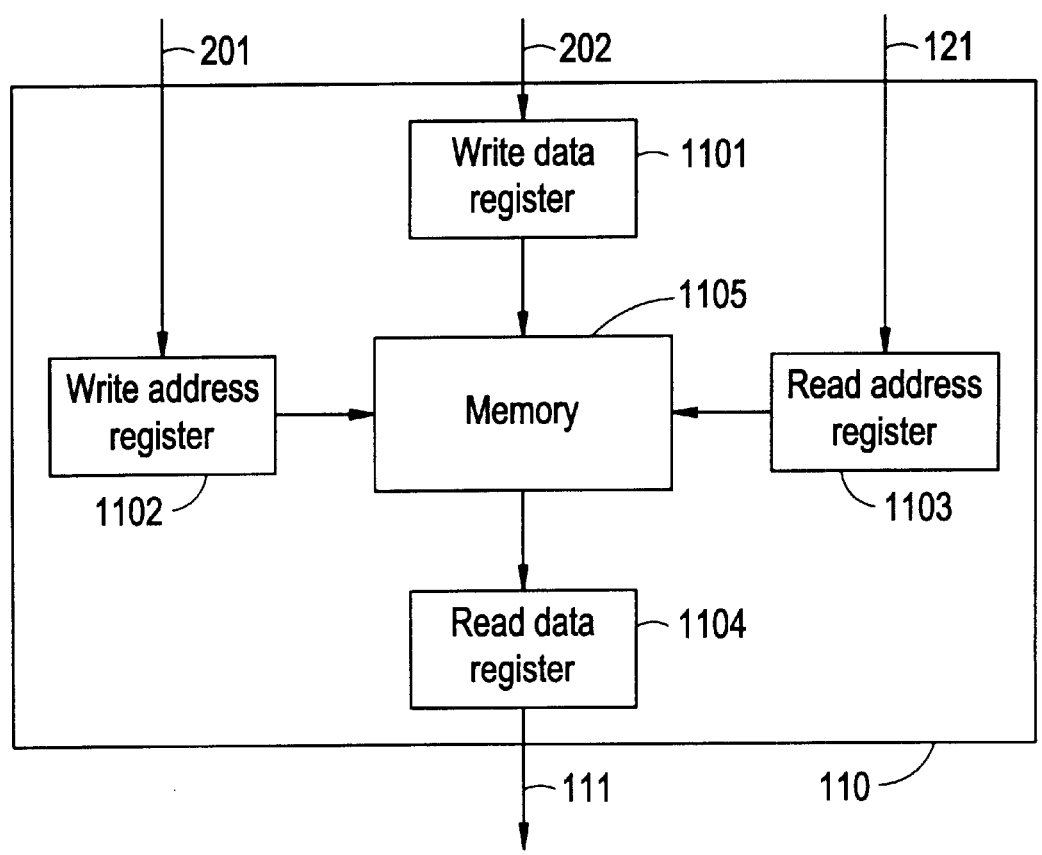
FIG. 2 is a block diagram of scheduling table storing element 110 of the present invention.

Referring to FIG. 1, a communication control apparatus 1 includes scheduling apparatus 100, an event producing element 200, a clock 300 and an event processing element 400. A scheduling apparatus 100 of the present invention includes a scheduling table storing element 110 and a table read time producing element 120.As As shown in FIG. 2, scheduling table storing element 110 has a scheduling table 1100. Scheduling table storing element 110 receives an event execution time 201 and an event identifier 202 from event producing element 200 and stores event identifier 202 in the scheduling table 1100 indicated by event execution time 201. Scheduling table storing element 110 also receives current time 121 from table read time producing element 120. Scheduling table storing element 110 reads and outputs an event identifier 111 which is stored at the entry of scheduling table 1100 indicated by current time 121.

Figure 3:
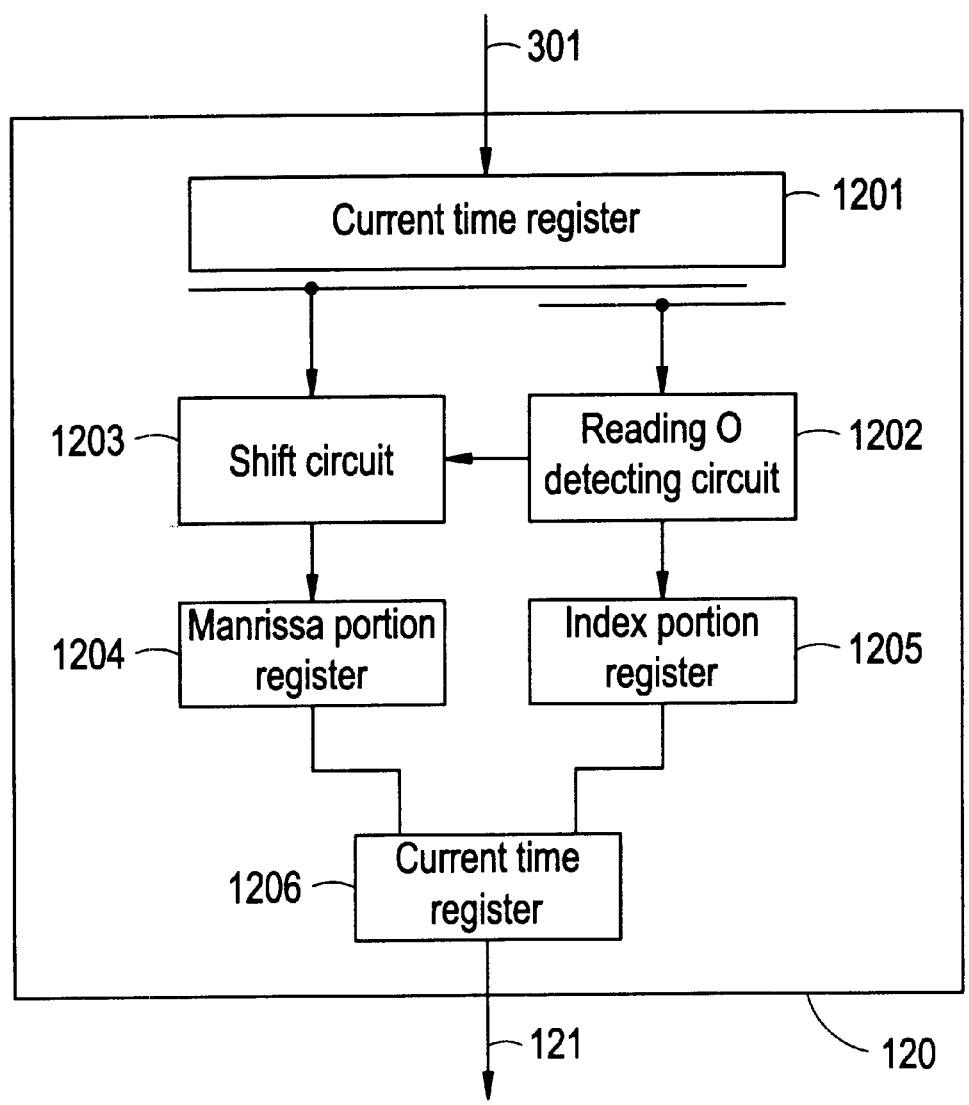
FIG. 3 is a block diagram of table read time producing element 120 of the present invention.

As shown in FIG. 3, table read time producing element 120 converts current time 301 received from clock 300 into floating point data and produces current time 121 represented by the floating point data. Table read time producing element 120 transmits the current time 121 to scheduling table storing element 110.

Event producing element 200 produces event execution time 201 and event identifier 202 of an event which is to be executed. In this embodiment, an event signifies a communication event, for example, the operation of transmitting a cell. Event execution time 201 is the time at which an event is scheduled to be executed, however, it may be the time at which the event is actually executed. Event identifier 202 is information for identifying a respective event. Event producing element 200 produces a corresponding event execution time 201 as floating point data based on the accuracy necessary for executing the event. For example, event producing element 200 forms floating point data based on a communication rate of each event. In this case, when the communication rate is large, i.e., a large communication amount per second, event execution time 201 is formed as floating point data having a small index unit. When the communication rate is small, i.e., a small communication amount per second, event execution time 201 is formed as floating point data having a large index unit. An example of a communication rate is a cell rate. Event producing element 200 transmits event execution time 201 and event identifier 202 to scheduling table storing element 110 of scheduling apparatus 100.

As shown in FIG. 1, clock 300 produces current time 301 and transmits it to table read time producing element 120 of scheduling apparatus 100. Current time 301 is represented by binary integer data.

Event processing element 400 executes an event process corresponding with the event identifier 111 outputted from scheduling table storing element 110 of scheduling apparatus 100.

Referring to FIG. 2, scheduling table storing element 110 includes a write data register 1101, a write address register 1102, a read address register 1103, a read data register 1104 and a memory 1105.

Write data register 1101 receives event identifier 202 from event producing element 200 and stores it. Event identifier 202 which is stored in write data register 1101 is the write data supplied to memory 1105.

Write address register 1102 receives event execution time 201 from event producing element 200 and stores it. Event execution time 201 stored in write address register 1102 is used as a write address when event identifier 202 is written to memory 1105.

Read address register 1103 receives current time 121 from table read time producing element 120 and stores it. Current time 121 stored in read address register 1103 is used as a read address for reading event identifier 202 stored in memory 1105.

Read data register 1104 stores event identifier 202 read from memory 1105. Event identifier 202 stored in read data register 1104 is transmitted to event processing element 400 as event identifier 111.

Memory 1105 stores event identifier 202 as write data to an address indicated by event execution time 201 stored in write address register 1102. Memory 1105 reads event identifier 202 from an address indicated by current time 121 stored in the read address register 1105.

Referring to FIG. 3, table read time producing element 120 includes a current time register 1201, a reading 0 detecting circuit 1202, a shift circuit 1203, a mantissa portion register 1204, an index portion register 1205 and a current time register 1206.

Current time register 1201 receives current time 301 from clock 300 and stores it. Current time 301 is binary integer data of $(M+2^E)$ bits (M and E are integers greater than zero). The lower $2^E$ bits of current time 301 stored in current time register 1201 are outputted to reading 0 detecting circuit 1202. The upper $(M+2^E-1)$ bits of current time 301 stored in current time register 1201 are outputted to shift circuit 1203.

Reading 0 detecting circuit 1202 receives the lower $2^E$ bits of current time 301 from current time register 1201. Reading 0 detecting circuit 1202 counts the number of 0 bits in current time 301 which are consecutive from the lowest bit. Reading 0 detecting circuit 1202 outputs the number of 0 bits counted to shift circuit 1203 and index portion register 1205. The number of 0 bits transmitted to index portion register 1205 is represented as E bits and constitutes the index portion of current time 121. Current time 121 consists floating point data of (M+E) bits from current time 301.

Shift circuit 1203 receives the upper $(M+2^E-1)$ bits of current time 301 from current time register 1201 and receives the number of 0 bits from reading 0 detecting circuit 1202. Shift circuit 1203 shifts the upper $(M+2^E-1)$ bits of current time 301 to the right by the number of 0 bits received from reading 0 detecting circuit 1202. Shift circuit 1203 outputs the lower M bits of a shifted result to mantissa portion register 1204. The lower M bits of the shifted result outputted from shift circuit 1203 constitutes the mantissa portion of current time 121.

Mantissa portion register 1204 stores the M bit mantissa received from shift circuit 1203. Mantissa portion register 1204 outputs the M bit mantissa to the upper M bits of current time register 1206.

Index portion register 1205 stores the E bit index received from reading 0 detecting circuit 1202. Index portion register 1205 outputs the E bit index to the lower E bits of current time register 1206.

Current time register 1206 respectively stores the M bit mantissa from mantissa portion register 1204 in the upper M bits and the E bit index from index portion register 1205 in the lower E bits. Current time register 1206 stores current time 121 which is represented by floating point data of (M+E) bits. Current time 121 is outputted to scheduling table storing element 110.

Circuits for reading 0 detecting circuit 1202 and shift circuit 1203 are well-known.

FIG. 4 shows an example of current time 121 represented as floating point data by table read time producing element 120. In this example, table read time producing element 120 produces floating point data of 6 bits from current time 301 represented as binary integer data of 8 bits. The lower 2 bits of current time 121 represent the index portion and the upper 4 bits represent the mantissa portion. Current times 121 that have the same index portions are formed in a ring-like shape in scheduling table 1100.

Next, the operation of this embodiment will be described below.

First, the operation of storing a produced event in scheduling table 1100 will be described.

Figure 5:
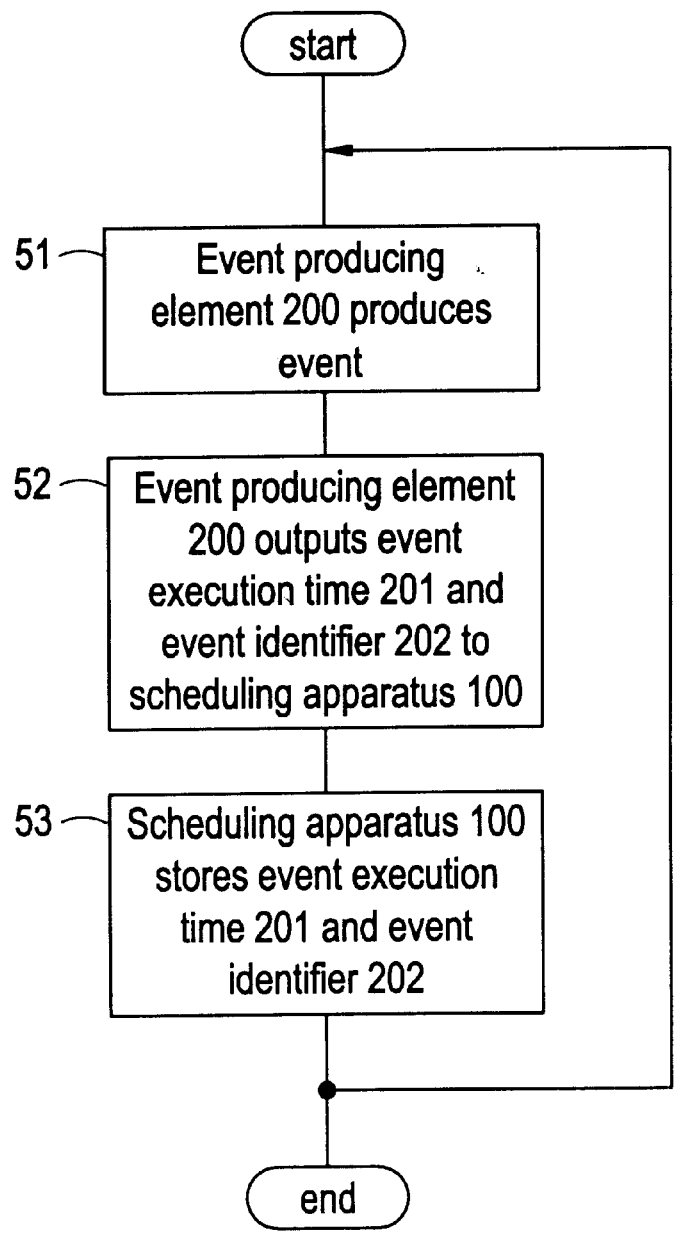
FIG. 5 is a flow chart showing the operation of the present invention.

Referring to FIG. 5, event producing element 200 produces an event (step 51). The event has an event identifier 202. Event producing element 200 produces an event execution time 201 as the time of executing the produced event. Event execution time 201 is represented as floating point data. At step 52, event producing element 200 transmits event execution time 201 and event identifier 202 to scheduling table storing element 110 of scheduling apparatus 100.

In scheduling apparatus 100, scheduling table storing element 110 receives event execution time 201 and event identifier 202. Scheduling table storing element 110 stores event identifier 202 at the entry of scheduling table 1100 indicated by event execution time 201 (step 53). When the storing operation in scheduling table 1100 has been finished, the operation returns to step 51.

Next, the operation of reading the event from scheduling table 1100 will be described below.

Figure 6:
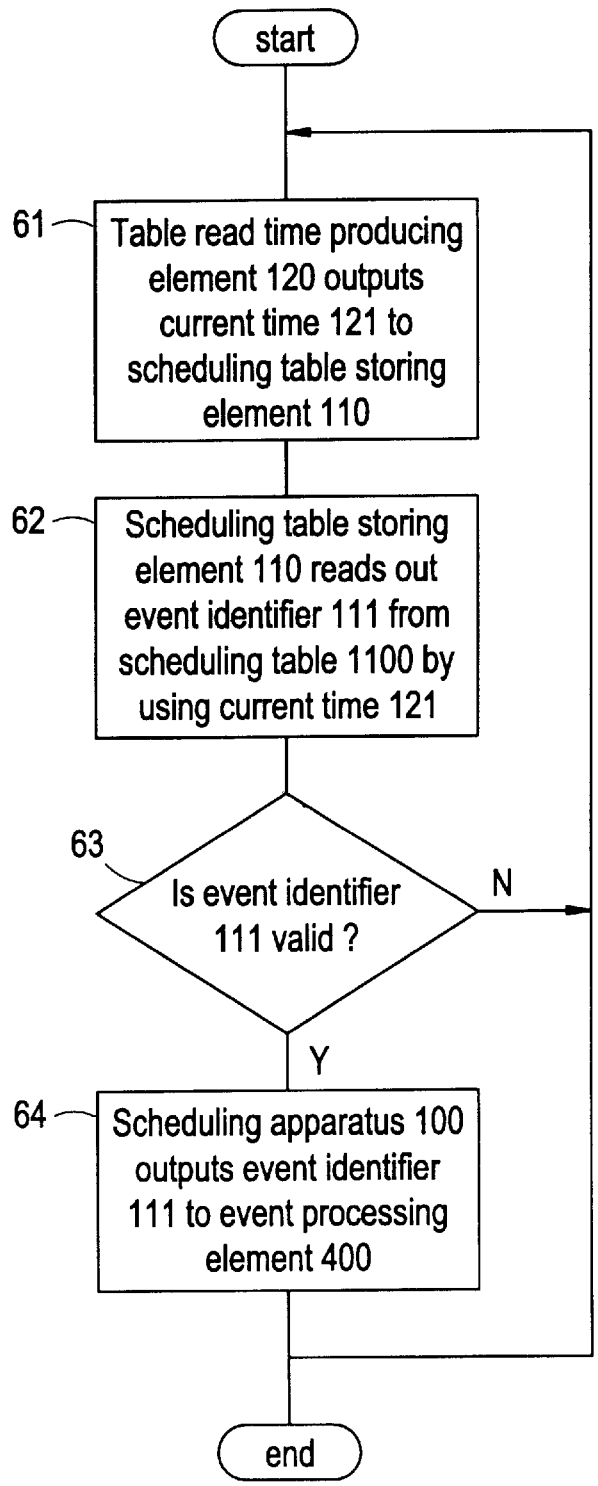
FIG. 6 is a flow chart showing the operation of the present invention.

Referring to FIG. 6, in step 61, table read time producing element 120 transmits current time 121, which has been converted into floating point data, to scheduling table storing element 110 of scheduling apparatus 100.

In scheduling apparatus 100, scheduling table storing element 110 receives current time 121 represented as floating point data and reads event identifier 111 from the entry of scheduling table 1100 of scheduling table storing element 110 indicated by current time 121 (step 62).

Next, scheduling apparatus 100 determines whether or not event identifier 111 read from scheduling table storing element 110 is valid (step 63). When event identifier 111 is not stored in the corresponding entry, event identifier 111 is invalid. When event identifier 111 is stored, event identifier 111 is valid. This processing may be performed, for example, by providing an element which checks the content of read data register 1104 in scheduling table storing element 110 or may be performed by providing an element which checks an output from read data register 1104 at the outside of scheduling table storing element 110.

When it is determined in scheduling apparatus 100 that event identifier 111 is valid, scheduling apparatus 100 outputs event identifier 111 to event processing element 400 (step 64). When the output to event processing element 400 finishes, the operation returns to step 61.

At step 63, when it is determined in scheduling apparatus 100 that event identifier 111 is invalid, the operation returns to step 61.

In this manner, in this embodiment, a scheduling process based on the accuracy of the event execution time is performed. More specifically, scheduling table storing element 110 has a scheduling table 1100 in which a data pair comprised of (1) event identifier 202 and (2) event execution time 201 represented by the floating point data are stored. Since current time 121 is represented by floating point data, the capacity of scheduling table 1100 can be reduced. Further, because the operation is executed with respect to an event in which the accuracy of execution time is not high, but rather is at a minimum necessary accuracy, it is possible to scheduled the events efficiently.

Although the embodiment is constituted such that event producing element 200 produces an event, the communication control apparatus 1 may be connected to an upper apparatus and event producing element 200 may receive an event produced by the upper apparatus. In this case, the upper apparatus transmits an event identifier and event execution time represented by integer data to event producing element 200. Event producing element 200 performs an event identifying process. That is, event producing element 200 determines whether or not the event is produced based on the received event. When event producing element 200 determines that the event is produced, event producing element 200 converts the received event execution time into event execution time 201 represented by the floating point data. When it is determined in event producing element 200 that the event is not produced, the operation returns again to the event identifying process.

While this invention has been described in conjunction with the preferred embodiments described above, it will now be possible for those skilled in the art to put this invention into practice in various other manners.

What is claimed is:

1. A scheduling apparatus comprising:
   a first element which stores a data pair comprising (1) an identifier for identifying a communication event and (2) time information which shows a time for executing said communication event and which is represented by floating point data having an accuracy necessary for said communication event;
   a second element which reads out said identifier from said first element by using current time information which is represented by the floating point data;
   a third element which converts said current time to the floating point data and transmits said current time to said second element as a read address;
   wherein said third element comprises:
      a counting element which counts a number of consecutive 0 bits from the lowest bit of said current time which is represented as binary integer data; and
      a shifting element which shifts said current time to the right based on a value counted by said counting element;
      wherein said time information has a mantissa which is produced based on a shift result by said shifting element and an index which is produced from a value counted by said counting element.

2. The scheduling apparatus as claimed in claim 1, wherein said mantissa is a part of said shift result by said shifting element.

3. A scheduling apparatus comprising:
   a first element which stores a data pair comprising (1) a first event to be executed at a first execution frequency and (2) first time information which has a first accuracy based on said first execution frequency and shows time when said first even is executed and stores a data pair comprising (1) a second even to be executed at a second execution frequency and (2) second time information which has a second accuracy based on said second execution frequency and shows time when said second event is executed;
   a second element which converts current time to one of said first or second time information;
   a third element which reads out said first event or said second event stored in said first element by using said first time information or said second time information converted from said current time by said second element;

wherein said second element comprises:
a counting element which counts a number of consecutive 0 bits from the lowest bit of said current time which is representing as binary integer data; and
a shifting element which shifts said current time to the right based on a value counted by said counting element;
wherein said first or second time information has a mantissa which is produced based on a shift result by said shifting element and an index which is produced from a value counted by said counting element.

4. The scheduling apparatus as claimed in claim 3, wherein said mantissa is a part of said shift result by said shifting element.

5. A scheduling method, which is performed by an apparatus connected to a storing element, comprising:
storing a data pair comprising (1) an identifier for identifying a communication event and (2) time information which shows a time for executing said communication even and is represented by floating point data having an accuracy necessary for communication said communication event to said storing element;
reading out said identifier from said storing element by using current time information which is represented by floating point data;
counting a number of consecutive 0 bits from the lowest bit of said current time information which is represented as binary integer data; and
shifting said current time to the right based on a value counted during said counting step;
wherein said time information has a mantissa which is produced based on a shift result during said shifting step and an index which is produced from a value counted during said counting step.

6. The scheduling method as claimed in claim 5, wherein said mantissa is a part of said shift result obtained during said shifting step.

7. The communication control apparatus comprising:
a first element which outputs time information which shows a time of executing a communication event and is represented as floating point data having an accuracy necessary for communicating said communication event and outputs an identifier which identifies said communication event corresponding to said time information;
a second element which receives said time information and said identifier from said first element and stores a data pair comprising (1) said time information and (2) said identifier;
a third element which reads out said identifier from said second element by using current time information which is represented by floating point data; and
a fourth element which converts said current time to floating point data and transmits said current time to said third element as a read address.

8. The communication control apparatus as claimed in claim 7, wherein said fourth element comprises:
a counting element which counts a number of consecutive 0 bits from the lowest bit of said time information which is represented as binary integer data; and
a shifting element which shifts said current time to the right based on a value counted by said counting element;
wherein said time information has a mantissa which is produced based on a shift result by said shifting element and an index which is produced from a value counted by said counting element.

* * * * *